United States Patent Office 2,963,467
Patented Dec. 6, 1960

2,963,467

PROCESS FOR THE HYDROGENATION OF RESINS

Augustus B. Small, Westfield, N.J., assignor to Esso Research and Engineering Company, a corporation of Delaware No Drawing. Filed Oct. 30, 1958, Ser. No. 770,603

6 Claims. (Cl. 260—82)

This invention relates to a method for improving the softening properties and the color of hydrocarbon resins prepared by polymerizing unsaturated hydrocarbon-containing streams with a Friedel-Crafts type catalyst. This application is a continuation-in-part of application Serial No. 501,175, filed April 13, 1955 and now abandoned, which in turn is a continuation-in-part of application Serial No. 474,999, filed December 13, 1954 and now abandoned.

In particular, the invention relates to the use of a series of steps at particular conditions to produce a finished resin of low color and of higher softening point. More particularly, the invention relates to particular steps in connection with the hydrogenation of cracked petroleum resins in a volatile solvent and the separation of such resins from such solvent to produce a substantially water white resin having a softening point above about 85° C.

Hydrocarbon resins can be produced from certain unsaturated petroleum refinery streams which contain various mixtures of acyclic and cyclic olefins and diolefins by contact with a Friedel-Crafts type catalyst under relatively low temperatures, e.g., −150° to +200° F. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g., 50 to 90 mole percent, at temperatures of approximately 1,000 to 1,600° F. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam cracked hydrocarbon streams such as described above and more particularly below may be employed. For example, a resin may be prepared from feed stocks having a relatively wide boiling range, e.g., 50° to 450° F., preferably 70° to 400° F. from which essentially all of the $C_4$ hydrocarbons and lighter hydrocarbons have been removed, although one may also use one or more narrower fractions such as the 100° to 300° F. fraction, the 300° to 450° F. fraction, etc. It is also sometimes advantageous to remove the isoprene from the naphtha. Typical analyses of such a wide steam cracked boiling fraction are shown in the following table:

TABLE I

Steam cracked naphtha fraction boiling between 50° and 450° F.

| Component | Approximate Boiling Range, °F. | Specific Example, Vol. Percent | General Range (60-160° F.), Vol. Percent |
|---|---|---|---|
| $C_5$ Fraction | 50 to 125 | 31 | 10 to 40 |
| $C_6$–$C_8$ Fraction | 125 to 300 | 64 | 30 to 70 |
| $C_9$–$C_{12}$ Fraction | 300 to 450 | 5 | 0 to 25 |

Although the actual content of various chemical classes of hydrocarbons present may vary somewhat according to the type of crude oil from which the gas-oil fraction is being cracked and according to the steam cracking conditions and fractionating conditions; nevertheless, in general, a desirable essentially debutanized steam-cracked naphtha fraction boiling between 50° and 450° F. will have approximately the following range in composition:

Percent by weight

Aromatic hydrocarbons _____ 10 to 50
Olefins _____ 30 to 70
Unreactive paraffins _____ 0 to 5

A typical sample of such a fraciton will consist essentially of about 5 to 20 wt. percent benzene, about 5 to 15 wt. percent toluene, about 0 to 25 wt. percent of $C_9$–$C_{12}$ aromatic hydrocarbons, about 5 to 15 wt. percent of cyclodienes, about 10 to 15 wt. percent aliphatic diolefins, about 15 to 60 wt. percent of mono-olefins and about 0 to 5 wt. percent unreactive paraffins.

It is desirable from a commercial point of view to have light colored resins. Resins high in unsaturation are generally dark yellow to amber in color and must be further treated if a light yellow or water-white resin is desired. It is also desirable for many uses, e.g., in floor tiles, to obtain resins having relatively high softening points. It is known that a steam cracked resin containing unsaturated hydrocarbon components can be hydrogenated in solution with a diluent to produce a solution that is improved in color. However, experience has shown that a resin having a softening point above 85° C. cannot be recovered from the solution without serious color degradation. The solution of resin in diluent is, in most instances, water white but loss in color is obtained during the subsequent stripping step to produce the high-softening point resin.

It is therefore, an object of this invention to provide an improved method for hydrogenating resins produced by Friedel-Crafts polymerization of a steam-cracked petroleum stream.

Another object of the invention is to treat a resin prepared by the polymerization of a steam-cracked petroleum stream in the presence of a Friedel-Crafts catalyst whereby the resulting resin is colorless and has a softening point of at least 85° C.

Still another object of the invention is to provide an improved method for the hydrogenation and stripping of a steam-cracked resin whereby the resulting stripped resin has a softening point of at least 85° C. and is water white in color.

A further object of this invention is to provide a method of treating a steam-cracked resin both before and after hydrogenation whereby the resulting resin is substantially colorless and has a softening point of at least 85° C.

Still other objects and advantages of this invention will be obvious to one skilled in the art from the accompanying description.

These and other objects of this invention are accomplished by subjecting the resin obtained by Friedel-Crafts polymerization of steam-cracked streams to special treatment prior to and after hydrogenation.

The resin to be subjected to treatment in accordance with this invention is prepared by subjecting a steam-cracked naphtha stream having a boiling range of about 50 to 450° F., preferably 100 to 400° F., from which all $C_4$ hydrocarbons have been removed or any narrow fraction thereof, to polymerization with a Friedel-Crafts catalyst such as $AlCl_3$, $BF_3$, $SnCl_4$, $TiCl_4$, $AlBr_3$, or their complexes at a temperature of about −150 to +200° F., preferably 70 to 130° F. The amount of catalyst will vary according to the temperature and composition of the feed but normally should be about 0.1 to 5.0, preferably 0.5 to 2.0%, by weight based on the approximate proportion of polymerizable constituents in the feed.

It is generally preferable to reduce the cyclic diolefin content present in the naphtha feed to less than 5% and, preferably to less than 2%, prior to the polymerization. This is accomplished by heat-soaking the naphtha feed at a temperature of about 180 to 240° F. for about 2 to 24 hours to dimerize the cyclodienes. The product is then distilled to separate the dimers as bottoms.

After the polymerization has been effected, the resin is treated in accordance with the present invention to remove the volatile solvent and low boiling oil obtained along with the resin. This is accomplished by steam stripping the resin product to obtain a product having a softening point of at least 100° C. While it is usual to strip the resin after it has been prepared in order to remove the solvent, it is a particular feature of this invention to strip it down to a 100° C. softening point. This step in connection with the subsequent hydrogenation step and a post hydrogenation stripping step results in the obtaining of a final resin which is both water white and has a high softening point. The final softening point will depend upon the degree of stripping prior to hydrogenation, the higher the softening point of the stripped resin before hydrogenation the higher the softening point of the stripped water-white resin after hydrogenation, provided, of course, that the hydrogenation is carried out in a volatile solvent as described below.

The stripped resin is then dissolved in a volatile hydrocarbon solvent which has a critical temperature below 300° C. and above the maximum hydrogenation temperature, preferably between 215° and 270° C. The concentration of such solution may vary from about 10 to about 70 wt. percent by weight of resin for the hydrogenation step. Suitable hydrocarbons include hexane, isohexane, 3-methyl-pentane, neohexane, diisopropyl heptane, isoheptane, 3-methyl-hexane, 2,2-dimethyl-pentane, 2,3-dimethyl-pentane, 2,4-dimethyl-pentane, 3,3-dimethyl-pentane, triptane, 3-ethyl-pentane, benzene and mixtures thereof.

The hydrogenation is effected under a pressure of about 100 to 5000 p.s.i.g., preferably about 500 to 3000 p.s.i.g., at temperatures of 38° to 230° C., preferably about 175 to 215° C., for a few minutes up to 30 hours or more, but preferably about 1 to 20 hours, in the presence of a suitable hydrogenation catalyst such as nickel, reduced nickel, nickel sulfide, copper chromide, cobalt molybdate, molybdenum sulfide, or various catalysts supported on light porous or granular particles of large surface area such as $MoS_2$ on charcoal. The hydrogenation may be carried out batchwise or continuously. The amount of catalyst in a batch operation should generally be about 5 to 50% by weight based on the amount of resin being subjected to hydrogenation. If continuous hydrogenation is used, the feed rate of resin solution through the catalyst bed should be about 0.1 to 5, preferably about 0.3 to 1.0, v./v./hr., i.e., volumes liquid feed per volume of catalyst per hour. The extent of hydrogenation may be determined by either the pressure drop caused by hydrogen consumption or by periodic examination on samples of the resin solution during the course of hydrogenation.

When the hydrogenation has been completed, the resin solution may be either stored and shipped as such or may be subjected to stripping under low pressure, e.g. steam stripping or vacuum stripping, to remove the volatile solvents as well as any other low molecular weight substances present. It is important, however, that this stripping process be effected under conditions sufficiently stringent only to form a substantially water-white color in the resin, but without any substantial reduction in softening point in the resin or any other substantial degradation thereof. This may be accomplished using conventional steam stripping techniques under mild stripping conditions. An absolute pressure range of 0.5 to 100 mm. of mercury pressure is suitable for purposes of this invention, it being understood that it is preferred to use as low a pressure as possible. Hence, a range of 0.5 to 10 mm. of mercury pressure is particularly suitable. The resin may be stripped at any temperature above its melting point but for the purposes of this invention, i.e., to produce a water-white resin of high softening point, the temperature should not exceed about 260° C. A temperature range of about 150° to 260° C. is, therefore, suitable for the purposes of this invention using a stripping time of from about 20 to about 60 minutes with the longer time periods being employed with the lower temperatures and vice versa.

The resulting hydrogenated resin, according to the invention, has a Gardner color, in the 100% solids state, of less than 2 (on the Hazen scale of less than 500), and preferably of less than one (on the Hazen scale of less than about 300) and most preferably it is water-white. The iodine number (ASTM) generally is less than 100 and may range substantially down to zero. The hydrogenated resin is completely soluble in petroleum hydrocarbons such as hexane and mixed paraffinic hydrocarbons of the volatile naphtha boiling range, and also in aromatic hydrocarbons such as pure benzene, toluene, xylene, etc., or mixed aromatic fractions as obtained by thermal or catalytic cracking of petroleum gas oil fractions. However, these resins are either substantially insoluble or only have a low solubility in low molecular weight organic solvents such as methanol, ethanol, isopropanol, acetone, methylethylketone, ether, etc. In general, their molecular weight is believed to be in the range of 500 to 2000, and generally about 1000 to 1500. These hydrogenated resins are also completely compatible with natural drying oils such as soya or linseed oils in 1:1 and 2:1 oil: resin ratio. Mixtures of 10–70% resin and 30–90% drying oil give improved surface coatings of materially lighter color.

The objects, advantages and details of the invention will be better understood from the following experimental data.

In the following examples the feed or raw material which was subjected to polymerization was made by steam-cracking a gas oil petroleum fraction derived from a paraffinic type crude, the cracking being carried out at a temperature of about 1200 to 1300° F. and pressure of 10 to 20 p.s.i.g. in the presence of about 70–75 mol percent of steam.

The approximate analysis of the resultant steam-cracked naphtha, after debutanizing, was as follows:

| | Volume Percent |
|---|---|
| $C_5$ diolefins | 9–10 |
| $C_5$ olefins | 20–21 |
| $C_{6-8}$ diolefins | 8–10 |
| $C_{6-8}$ olefins | 14–15 |
| $C_{9-12}$ diolefins | 3 |
| $C_{9-12}$ olefins | 4 |
| Benzene | 15 |
| Toluene | 10 |
| Xylenes | 2–3 |
| $C_{9-12}$ aromatics | 5–6 |
| Paraffins | 3 |

This steam-cracked naphtha was then subjected to further distillation to remove substantially all of the isoprene overhead and also to remove most of the $C_8$ and higher hydrocarbons as bottoms.

The product now had approximately the following analysis:

| | Vol. percent (60° F./60° F.) |
|---|---|
| $C_5$ paraffins | 1 |
| $C_5$ piperylene (cis and trans) | 12 |
| $C_5$ tert. olefins | 8 |
| $C_5$ cyclopentene | 2 |
| $C_5$ other aliphatic olefins | 1 |
| $C_6$ benzene | 24 |
| $C_6$ hexadiene | 8 |
| $C_6$ cyclohexene | 6 |
| $C_6$ paraffins | 2 |
| $C_6$ N-olefins | 13 |
| $C_6$ tert. olefins | 5 |
| $C_6$ toluene | 7 |
| $C_7$ diolefins (mostly aliphatic) | 1 |
| $C_7$ cyclic olefins | 1 |
| $C_7$ N-olefins | 5 |
| $C_7$ tert. olefins | 2 |
| $C_{8-9}$ olefins and diolefins (incl. trace of aromatics) | 2 |

This product was then subjected to a heat-soaking at 220° F. for about 6 to 8 hours to effect dimerization of cyclopentadiene and its lower alkyl homologues such as methyl cyclopentadiene. The resulting product was subjected to distillation to remove the dicyclopentadiene products as bottoms. The overhead was condensed and subjected to Friedel-Crafts polymerization at a temperature of about 100 to 120° F. for 2 hours, using 1% by weight of aluminum chloride (based on the total feed) as catalyst. The resulting product was then subjected to various types of washing and recovery treatments, and hydrogenated under various conditions, as will be discussed in more detail herebelow.

EXAMPLE I

One sample of the above-described polymerization product was steam-stripped at a temperature up to 260° C. to recover a resin having a softening point of 100° C. The resin was dissoved in hexane and hydrogenated at 3000 p.s.i. pressure and 205° C. for eight hours in the presence of 480 grams of Harshaw nickel, (Harshaw Chemical Co., Cleveland, Ohio) catalyst. The hydrogenated solution was distilled to 160° C. pot temperature and stripped at 200 to 215° C. for twenty minutes at 10 mm. pressure with a small stream of nitrogen passing through the system.

Another sample was subjected to the same treatment except that it was stripped before hydrogenation to only 82° C. softening point and was hydrogenated in Varsol (straight run mineral spirits; API gravity 49.0; flash 105° F.; boiling range 150° to 200° C.; solvent power 33–37 kauri-butanol value) solution. The following data were obtained:

| | A | B |
|---|---|---|
| Hazen Color,[1] 20% Soln. Before Stripping | 25 | 25 |
| Hazen Color,[1] 20% Soln. After Stripping | 94 | 36 |
| Softening Point, ° C. | 82 | 87 |

A—Prior methods of treating resin before and during hydrogenation.
B—Method according to present invention.
[1] A Hazen color of 0 to 100–200 signifies a water-white product The above data show that a higher softening point resin (87° as compared to 82° C.) can be obtained by the process of this invention with far less degradation in color (a change of 25 to 36 as compared to 35 to 94) than was obtainable under previously known methods.

The terms "light colored resins" and "resins of low color" as used herein signify a resin having a Hazen color of 0 to 300.

What is claimed is:

1. A process for preparing substantially water-white petroleum resins of high softening points which comprises isolating a petroleum fraction boiling within the range of about 50° F. to 450° F. and having the following composition:

| | Percent by weight |
|---|---|
| Benzene | 5–20 |
| Toluene | 5–15 |
| $C_9$–$C_{12}$ aromatic hydrocarbons | 0–25 |
| Cyclodienes | 5–15 |
| Aliphatic diolefins | 10–15 |
| Mono-olefins | 15–60 |
| $C_4$+ paraffins | 0–5 | heat soaking said fraction to dimerize the cyclodienes contained therein and recovering a resin feed containing less than 5 wt. percent cyclodienes, polymerizing said feed in the presence of a Friedel-Crafts polymerization catalyst at a temperature of about −150° F. to about +200° F. to produce a resinous product, steam stripping said resinous product to a temperature sufficient to give a resin having a softening point of at least 100° C., dissolving the stripped resin in a hydrocarbon solvent having a critical temperature below 300° C. and above 215° C., hydrogenating the dissolved resin at a temperature between about 175° and 215° C. and at a pressure of 500 to 3000 p.s.i.g. in the presence of a hydrogenation catalyst, and stripping the hydrogenated resin at a temperature in the range of 150° to 260° C. under reduced pressure to produce a substantially water-white resin having a softening point of at least 85° C.

2. A process in accordance with claim 1 wherein said hydrogenated resin is stripped at an absolute pressure of less than 100 mm. mercury.

3. A process in accordance with claim 2 wherein said hydrogenated resin is stripped at an absolute pressure in the range of 0.5 to 10 mm. mercury.

4. A process for preparing substantially water-white petroleum resins of high softening points which comprises isolating a steam-cracked petroleum fraction boiling within the range of about 50° F. to 450° F. and having the following composition:

| | Percent by weight |
|---|---|
| Benzene | 5–20 |
| Toluene | 5–15 |
| $C_9$–$C_{12}$ aromatic hydrocarbons | 0–25 |
| Cyclodienes | 5–15 |
| Aliphatic diolefins | 10–15 |
| Mono-olefins | 15–60 |
| $C_4$+ paraffins | 0–5 | heat soaking said fraction to dimerize the cyclodienes contained therein and recovering a resin feed containing less than 5 wt. percent cyclodienes, polymerizing said resin feed in the presence of a Friedel-Crafts polymerization catalyst at a temperature of about −150° F. to about +200° F. to produce a resinous product, steam stripping said resinous product to a temperature sufficient to give a resin having a softening point of at least 100° C., dissolving the stripped resin in a hydrocarbon solvent having a critical temperature below 300° C. and above 215° C., hydrogenating the dissolved resin at a temperature between about 38° and 230° C. and at a pressure of 100 to 5000 p.s.i.g. in the presence of a hydrogenation catalyst, and stripping the hydrogenated resin at an elevated temperature and under a pressure of less than 100 mm. mercury for 20–60 minutes to produce a substantially water-white resin having a softening point of at least 85° C.

5. A process according to claim 4 wherein said hydrogenated resin is stripped at an elevated temperature in the range of 150° to 260° C.

6. A process for preparing substantially water-white petroleum resins of high softening points which comprises isolating a steam-cracked isoprene-containing naphtha fraction which is substantially free of $C_4$ and lower boiling hydrocarbons, has a boiling range of 50° F. to 450° F., and has the following composition:

| | Percent by weight |
|---|---|
| Benzene | 5–20 |
| Toluene | 5–15 |
| $C_9$–$C_{12}$ aromatic hydrocarbons | 0–25 |
| Cyclodienes | 5–15 |
| Aliphatic diolefins | 10–15 |
| Mono-olefins | 15–60 |
| Paraffins | 0–5 | removing substantially all of the isoprene and most of the $C_8$ and higher hydrocarbons from said fraction, recovering a cyclodiene-containing resin feed, heat soaking said feed to dimerize the cyclodienes contained therein and recovering a polymerization feed containing less than 5 wt. percent cyclodienes, polymerizing said polymerization feed to produce a resinous product, steam stripping said resinous product to a temperature sufficient to give a resin having a softening point of at least 100° C., dissolving the stripped resin in a hydrocarbon solvent having a critical temperature below 300° C. and above 215° C., hydrogenating the dissolved resin at a temperature between about 38° and 230° C. and at a pressure of 100 to 5000 p.s.i.g. in the presence of a hydrogenation catalyst and stripping the hydrogenated resin for 20–60 minutes at a temperature in the range of 150° to 260° C. under a pressure of less than 100 mm. mercury to produce a water-white resin having a softening point of at least 85° C.

References Cited in the file of this patent

UNITED STATES PATENTS

| 2,062,845 | Thomas et al. | Dec. 1, 1936 |
| 2,468,414 | Soday | Apr. 26, 1949 |
| 2,514,714 | Marhofer | July 11, 1950 |
| 2,734,046 | Nelson et al. | Oct. 1, 1952 |